United States Patent [19]
Tow

[11] Patent Number: 5,315,098
[45] Date of Patent: May 24, 1994

[54] METHODS AND MEANS FOR EMBEDDING MACHINE READABLE DIGITAL DATA IN HALFTONE IMAGES

[75] Inventor: Robert F. Tow, Palo Alto, Calif.
[73] Assignee: Xerox Corporation, Stamford, Conn.
[21] Appl. No.: 634,990
[22] Filed: Dec. 27, 1990
[51] Int. Cl.⁵ ............................................ G06K 19/06
[52] U.S. Cl. .................... 235/494; 235/469; 235/470
[58] Field of Search ............... 235/469, 470; 382/21

[56] References Cited
U.S. PATENT DOCUMENTS
5,091,966 2/1992 Bloomberg ........................ 235/494

*Primary Examiner*—Harold Pitts

[57] ABSTRACT

The present invention provides methods and means for encoding digital data in the angular orientation of circularly asymmetric halftone dot patterns that are written into the halftone cells of digital halftone images. In keeping with standard practices, the sizes of these halftone dot patterns are modulated in accordance with the grayscale data sample values that are provided to define the image, so the average reflectance or transmittance of each of the halftone cells is modulated to provide a more or less standard halftone rendering of the image. In accordance with this invention, however, provision is made for modulating the angular orientation of the halftone dot patterns in accordance with digital data values, thereby embedding the digital data in the halftone image.

8 Claims, 3 Drawing Sheets

METHODS AND MEANS FOR EMBEDDING MACHINE READABLE DIGITAL DATA IN HALFTONE IMAGES

FIELD OF THE INVENTION

This invention relates to techniques for embedding machine readable digital data in halftone images and, more particularly, to methods and means for encoding digital data by means of the rotation of the pixel patterns that are written in the halftone cells of such images.

BACKGROUND OF THE INVENTION

Halftoning is a well-known and widely utilized technique for imparting a grayscale appearance to dual tone renderings of variably shaded monochromatic images (e.g., black and white images) and to dual tone color separations of variably shaded polychromatic images. It originated as an optical analog process for imparting a grayscale appearance to dual tone reproductions of continuous tone monochromatic images, but it since has been extended to provide digital halftoning processes that can be utilized by digital document processors for imparting a grayscale appearance to dual tone representations of variably shaded, scanned-in digitized images and to dual tone representations of variably shaded, computer generated synthetic images. These digitally defined images may be monochromatic or polychromatic, so it is to be understood that digital halftoning can be applied for imparting a grayscale appearance to printed and displayed renderings of monochromatic and polychromatic images. Polychromatic images typically are halftoned by halftoning each of the color separations that are provided for rendering such images.

Polychromatic imaging (sometimes simply referred to as "color imaging") is becoming increasingly important and commonplace for digital image processing applications. It, therefore, is to be understood that the present invention can be applied for embedding digital data in printed and displayed renderings of these images, typically by identically encoding the data in each of the color separations that are provided for rendering them. In other words, the encoding process that is used for embedding digital data in halftoned renderings of polychromatic images typically involves multiple iterations of the process that is employed for embedding such data in halftoned renderings of monochromatic images. Accordingly, in the interest of simplifying this disclosure, the following discussion will concentrate on the monochromatic case.

As has been pointed out previously, the functional utility of plain paper and other types of hardcopy documents can be enhanced significantly if the human readable information that they normally convey is supplemented by adding appropriate machine readable digital data to them. Input scanners can be employed for recovering this machine readable data, so the data can be employed for various purposes during the electronic processing of such documents and their human readable contents by electronic document processing systems, such as electronic copiers, text and graphic image processing systems, facsimile systems, electronic mail systems, electronic file systems, and document and character recognition equipment. See, for example, the copending and commonly assigned United States patent application of Frank Zdybel, Jr. et al., which was filed May 30, 1990, under Ser. No. 07/530,677, on "Hardcopy Lossless Data Storage and Communications for Electronic Document Processing Systems." Also see the copending and commonly assigned United States patent application of Walter A. L. Johnson et al., which was filed May 30, 1990 under Ser. No. 07/530,753 on "Form and System Utilizing Encoded Indications for Form Field Processing."

As is known, machine readable digital data can be recorded by writing two dimensional marks on a recording medium in accordance with a pattern which encodes the data either by the presence or absence of marks at a sequence of spatial locations or by the presence or absence of mark related transitions at such locations. The bar-like codes which others have proposed for recording digital data on paper utilize that type of encoding. See U.S. Pat. No. 4,692,603 on "Optical Reader for Printed Bit-Encoded Data and Method of Reading Same," U.S. Pat. No. 4,728,783 and U.S. Pat. No. 4,754,127 on "Method and Apparatus for Transforming Digitally Encoded Data into Printed Data Strips," and U.S. Pat. No. 4,782,221 on "Printed Data Strip Including Bit-Encoded Information and Scanner Contrast." Another interesting approach is to encode machine readable digital data in the shapes of the marks or "glyphs" that are written on the recording medium. See, a copending and commonly assigned United States patent application of Dan S. Bloomberg, which was filed Jul. 31, 1990 under Ser. No. 07/560,514 on "Self Clocking Glyph Shape Codes."

Glyph shape codes have the advantage that they can be designed to have a relatively uniform appearance. For instance, a simple glyph shape code suitably is composed of small slash-like marks that are tilted to the right and left at, say, ±45° for encoding 1's and 0's, respectively. However, in some situations the more or less uniformly gray appearance of such a code may aesthetically objectionable, so there still is a need for even less obtrusive codes for encoding digital data on hardcopy documents.

SUMMARY OF THE INVENTION

In response to the above described need, the present invention provides methods and means for encoding digital data in the angular orientation of circularly asymmetric halftone dot patterns that are written into the halftone cells of digital halftone images. In keeping with standard practices, the sizes of these halftone dot patterns are modulated in accordance with the grayscale data sample values that are provided to define the image, so the average reflectance or transmittance (collectively referred to hereinafter as "reflectance" since transmittance is the reciprocal of reflectance) of each of the halftone cells is modulated to provide a more or less standard halftone rendering of the image. In accordance with this invention, however, provision is made for modulating the angular orientation of the halftone dot patterns in accordance with digital data values, thereby embedding the digital data in the halftone image.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with specific reference to certain embodiments, it is to be understood that there is no intent to limit it to those embodiments. On the contrary, the aim is to cover all alternatives, modifications, and equivalents falling within the spirit and scope of the invention as defined by the appended claims.

Figure 1:
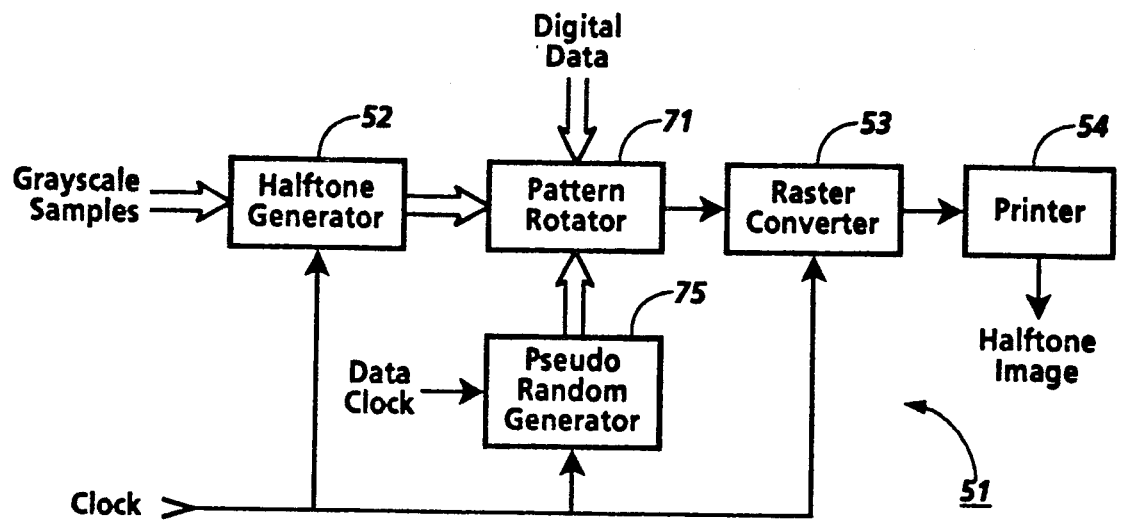
FIG. 1 is a simplified block diagram of a halftone imaging system that embodies the present invention.

Turning now to the drawings, and at this point especially to FIG. 1, there is a halftone imaging system 51 for producing halftone renderings of scanned-in or computer generated synthetic grayscale images. To that end, the imaging system 51 comprises a more or less conventional halftone generator 52 for transforming spatially periodic grayscale input image sample values into halftone dot patterns. In keeping with standard practices, these dot patterns are written into a spatially periodic, two dimensional array of halftone cells for modulating the average reflectances of the halftone cells in accordance with the values of the spatially corresponding grayscale image samples. For example, the halftone generator 52 suitably has a table look-up memory (not shown) that is addressed by the grayscale image sample values to retrieve halftone cells that are pre-programmed to contain appropriate halftone dot patterns. Thus, as illustrated, the imaging system 51 further includes a raster converter 53 for converting the programmed halftone cells into a serial data stream, and a raster printer 54 for tiling the program halftone cells onto a suitable recording medium, such as plain paper, in accordance with a raster scan pattern.

Figure 2:
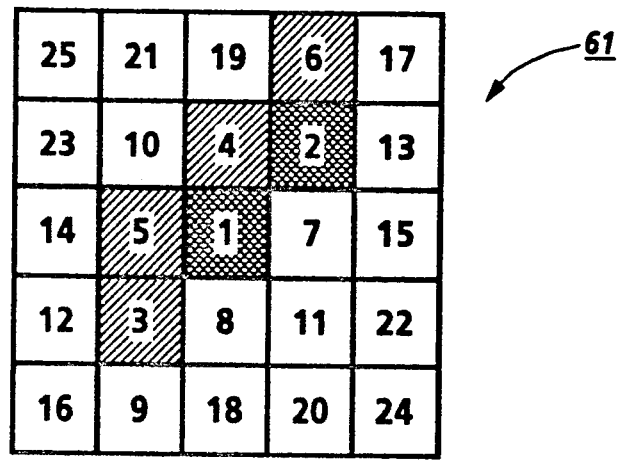
FIG. 2 is a diagram of a halftone cell that illustrates a suitable fill order for generating circularly asymmetric halftone dot patterns that are size modulated in accordance with grayscale input data sample values.
Figure 3A:
FIGS. 3A-3C illustrate the discrimination that is provided by this invention for encoding digital data values in the rotational orientation of the halftone dot pattern shown in FIG. 2.
Figure 3B:
Figure 3C:
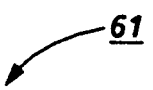

As is conventional, each of the halftone cells is composed of a two dimensional array of pixels. For instance, FIG. 2 illustrates a halftone cell 61 that is composed of a 5×5 array of pixels. Halftone dot patterns, such as the hatched pattern shown in FIG. 2, are written into the halftone cells by selectively altering the logical state of certain of their pixels, so that those pixels logically contrast with any unaltered or "background" pixels. For example, the pixels that define a halftone dot pattern may be set to a logical true ("1") state if the background pixels are maintained in a logical false ("0") state.

In keeping with this invention, a predetermined fill order is employed for writing the halftone dot patterns into the halftone cells, thereby ensuring that all of the halftone dot patterns are continuous patterns (i.e., patterns that are defined by a single pixel or by a plurality of spatially adjacent pixels) that are circularly asymmetric with respect to the geometric centers of the halftone cells into which they are written. A suitable fill order is given in FIG. 2 by the counting numbers that have been applied to the individual pixels of the halftone cell 61, but this is merely a representative example of a fill order for creating continuous, circularly asymmetric halftone dot patterns of varying size.

Focusing in some additional detail on FIG. 2, it will be seen that some of the pixels of the halftone cell 61 are crosshatched to indicate that they are not included in the fill order. Instead, these crosshatched pixels are set aside to function as dedicated background pixels for all of the halftone dot patterns. This has been done to maintain the circular assymmetry of the dot patterns and to simplify the task of discriminating between their different permissible angular orientations (see the subsequent discussion relating to the embedding of digital data into halftone images). Of course, the cost of providing these dedicated background pixels is that the grayscale resolution of the halftone cell 61 is slightly reduced (i.e., from a theoretical limit of twenty-six different grayscale levels to an actual limit of twenty-four levels in the illustrated case), and one extreme (say, the "black" extreme) of the grayscale range is slightly truncated. However, the human eye has limited high frequency resolution and limited grayscale acuity, so the truncation of the grayscale range and the reduced grayscale resolution may fall below the perceptual threshold of casual observers who view the halftone images that are produced at a normal viewing distance under normal illumination conditions. Indeed, as illustrated, the opposite or "white" end of the grayscale range may also be truncated by mandating that each halftone cell contain a halftone dot pattern composed of at least one and preferably two or so pixels (a two pixel truncation reduces the grayscale resolution by two grayscale levels). The advantage of that mandate is that it permits the halftone dot patterns to function as a self-clocking code for embedding digital data in halftone images. Alternatively, to avoid the use of dedicated background pixels, the encoded data may be confined to one or more predetermined regions of a halftone image since conventional image processing techniques may be used to identify and segment such regions. For example, the data may be encoded in the midtones of a face on a "black" background, and conventional techniques could then be used to identify the spatial extent of the face as a region to be passed as a single entity to the data extraction mechanism. Additionally, it is to be understood that the spatial periodicity of the halftones could be varied.

More particularly, in accordance with this invention, the halftone imaging system 51 of FIG. 1 additionally includes a pattern rotator 71, which is coupled between the halftone generator 52 and the raster converter 53, for modulating the angular orientations of the halftone dot patterns in accordance with a time synchronized series of digital data values (supplied by means not shown). As shown in FIGS. 2 and 3A-3C, the angular orientations of the halftone dot patterns are modulated by rotating the square halftone cells about their geometric centers, so up to two bit long binary values may be embedded in the halftone images that are produced by employing dot pattern orientations of 0° (FIG. 2), 90° (FIG. 3A), 180° (FIG. 3B), and 270° (FIG. 3C) for encoding the different values a two bit long binary number may take. If desired, however, provision (not shown) could be made for modulating the angular orientations of the halftone dot patterns independently of the halftone cells, thereby permitting even longer digital data values to be encoded in them. For example, the halftone dot patterns could be rotated about the geometric centers of the halftone cells in accordance with respective digital data values, and rotated dot patterns could then be mapped or remapped into their respective halftone cells. As will be appreciated, the transformations that are employed for encoding digital data in the angular orientations of the halftone dot patterns are conventional affine rotational transformations that can be implemented through the use of standard techniques for performing such transformations.

Figure 4:
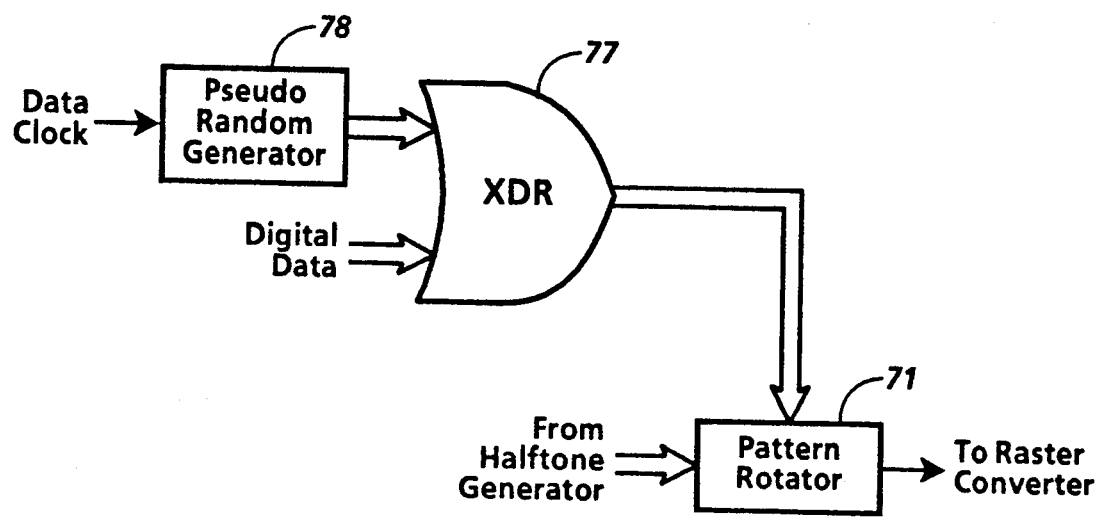
FIG. 4 is a simplified block diagram that illustrates an alternative technique for superimposing a pseudo random rotation on the halftone dot patterns.

The encoding of digital data in the angular orientation of the halftone dot patterns of a halftone image may tend to create some undesirable texturing of the image. Fortunately, however, this texturing may be reduced in a variety of different ways. One way to accomplish that is to superimpose a pseudo random modulation on the rotation of the halftone dot patterns. This can be done, as shown in FIG. 1, by providing a pseudo random sequence generator 75 for driving the pattern rotator 71 with a pseudo random sequence of digital values. In that event, the digital data values are encoded in the rotation of the halftone dot patterns as described above, but the angular orientation of the halftone dot patterns is additionally modulated in accordance with the pseudo random sequence. As shown in FIG. 4, a similar effect can be achieved by pseudo randomly encoding the digital data values prior to applying them to the pattern rotator 71. To carry such pseudo random encoding, the digital data values suitably are exclusively bit ORed, by an exclusive OR gate 77, with a pseudo random sequence of digital values that are supplied by a pseudo random sequence generator 78.

Figure 5:
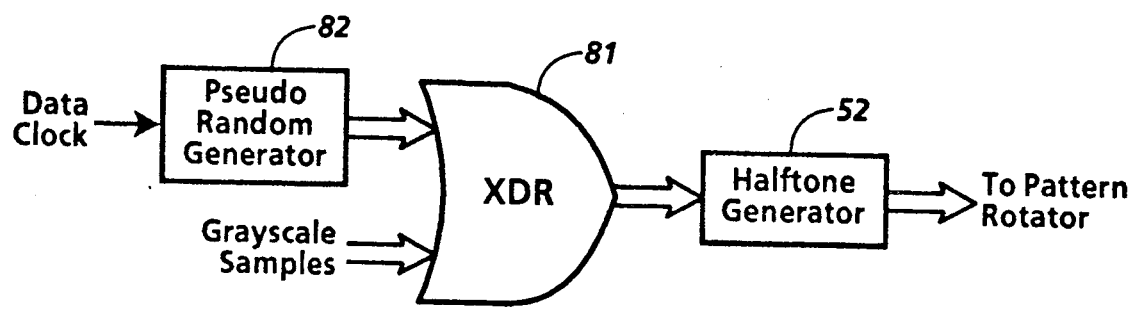
FIG. 5 is a simplified block diagram that illustrates technique for superimposing a pseudo random modulation on the halftone image.

The texturing of the halftone images may also be reduced by pseudo randomly encoding the grayscale input image samples. For that purpose, as shown in FIG. 5, there is an exclusive OR gate 81 for exclusively bit ORing the grayscale image samples with a pseudo random sequence of grayscale values that are supplied by a pseudo random sequence generator 82. This approach is, however, distinguishable from the above-described techniques for pseudo randomly modulating the angular orientation of the halftone dot patterns because the pseudo random encoding of the grayscale samples superimposes a pseudo random modulation on the halftone image, thereby obscuring the human readable information content of the image. Accordingly, this technique is useful primarily for applications in which it is desired to transmit sensitive human readable information via the pseudo randomly modulated halftone image.

CONCLUSION

In view of the foregoing, it will now be understood that the present invention provides methods and means for encoding machine readable digital data in halftone images. In particular, it will be evident that the circular asymmetry of the size modulated halftone dot patterns, which are provided in accordance with this invention for modulating the average reflectances of the halftone cells of such an image in accordance with grayscale input image samples, enables digital data to be encoded in the angular orientation of the halftone dot patterns.

Furthermore, it will be understood that a supplemental pseudo random modulation may be superimposed on the angular orientation and/or the size of the halftone dot patterns.

What is claimed is:

1. A system for encoding digital data in halftone images, said system comprising
    a halftone generator for supplying circularly asymmetric halftone dot patterns that are size modulated in accordance with grayscale input image sample values;
    pattern rotating means for angularly orienting said halftone dot patterns in accordance with respective digital data values; and
    output means for writing said angularly oriented dot patterns into tiled halftone cells of predetermined size on a recording medium for producing a halftone rendering of said image with said digital data encoded in the angular orientation of the halftone dot patterns.

2. The system of claim 1 further including
    means coupled to said pattern rotating means for pseudo randomly modulating the angular orientation of said halftone dot patterns.

3. The system of claim 1 further including
    pseudo random encoding means for pseudo randomly encoding said digital data values, thereby superimposing a pseudo random modulation on the angular orientation of said halftone dot patterns.

4. The system of any one of claims 1-3 further including
    pseudo random encoding means for pseudo randomly encoding said grayscale values, thereby superimposing a pseudo random modulation on said halftone rendering of said image.

5. A method for encoding digital data in a hardcopy rendering of a halftone image that is defined by circularly asymmetric halftone dot patterns of varying size; said method comprising the steps of
    rotationally modulating said halftone dot patterns in accordance with said digital data; and
    writing said rotationally modulated dot patterns into tiled halftone cells of predetermined size on a recording medium, thereby producing said hardcopy rendering with said digital data encoded therein.

6. The method of claim 5 further including the step of pseudo randomly modulating the rotation of said halftone dot patterns.

7. The method of claim 6 wherein
    said digital data values are pseudo randomly modulated to pseudo randomly modulate the rotation of said halftone dot patterns.

8. The system of any one of claims 5-7 further including the steps of
    generating said half tone dot patterns in response to respective grayscale values, and
    pseudo randomly encoding said grayscale values, thereby superimposing a pseudo random modulation on said hardcopy rendering of said image.

* * * * *